United States Patent [19]

Hambleton et al.

[11] Patent Number: 4,784,763

[45] Date of Patent: Nov. 15, 1988

[54] WATER PURIFICATION MACHINE

[75] Inventors: Larry G. Hambleton, Olathe, Kans.; Charles A. Moss, Lees Summit, Mo.; Jim Hunter, Shawnee, Kans.

[73] Assignee: Labconco Corporation, Kansas City, Mo.

[21] Appl. No.: 73,063

[22] Filed: Jul. 13, 1987

[51] Int. Cl.[4] .......................... B01D 13/00; C02F 1/44
[52] U.S. Cl. .................................... 210/90; 210/96.2; 210/195.2; 210/258; 210/416.3; 210/900
[58] Field of Search ............. 210/90, 96.2, 137, 195.2, 210/252, 257.2, 258, 416.3, 900

[56] References Cited

U.S. PATENT DOCUMENTS

| | | | |
|---|---|---|---|
| 3,856,676 | 12/1974 | Grimme, Jr. et al. | 210/96.2 X |
| 3,870,033 | 3/1975 | Faylor et al. | 210/900 X |
| 3,967,638 | 7/1976 | Tondreau | 210/257.2 X |
| 4,160,727 | 7/1979 | Harris, Jr. | 210/257.2 X |
| 4,277,332 | 7/1981 | Baughn | 210/96.2 |
| 4,280,912 | 7/1981 | Berry, III et al. | 210/900 X |
| 4,342,651 | 8/1982 | Ahrens | 210/195.2 X |
| 4,498,982 | 2/1985 | Skinner | 210/195.2 X |
| 4,548,716 | 10/1985 | Boeve | 210/900 X |
| 4,585,554 | 4/1986 | Burrows | 210/195.2 X |
| 4,595,497 | 6/1986 | Burrows | 210/195.2 X |
| 4,595,498 | 6/1986 | Cohen et al. | 210/195.2 X |
| 4,622,133 | 11/1986 | Furuno | 210/195.2 X |
| 4,623,467 | 11/1986 | Hamlin | 210/257.2 X |
| 4,655,909 | 4/1987 | Furuno | 210/90 |
| 4,657,674 | 4/1987 | Burrows | 210/195.2 X |
| 4,678,565 | 7/1987 | Norton | 210/257.2 X |
| 4,682,113 | 7/1987 | Barben, II | 210/900 X |

Primary Examiner—Robert Spitzer
Attorney, Agent, or Firm—Kokjer, Kircher, Bradley, Wharton, Bowman & Johnson

[57] ABSTRACT

A method and apparatus for purifying water to two different laboratory quality levels of purity, both of which are made available for dispensing. Ordinary tap water is prefiltered and treated by reverse osmosis to produce virtually salt free product water which is made available to a cabinet mounted faucet. The product water is delivered to a system of polishing cartridges which produce polished water and supply it to a special hand held dispensing gun. A recirculation pump operates to recirculate the water in the polishing system to prevent it from standing and eliminate the need for water storage. The product water is also recycled through the reverse osmosis cartridge. Some of the reject water from the RO cartridge is directed to a drain, but most of the reject water is recycled to conserve water. A microprocessor based control system monitors and displays the water quality and other conditions and generates an alarm if an abnormal condition arises.

22 Claims, 5 Drawing Sheets

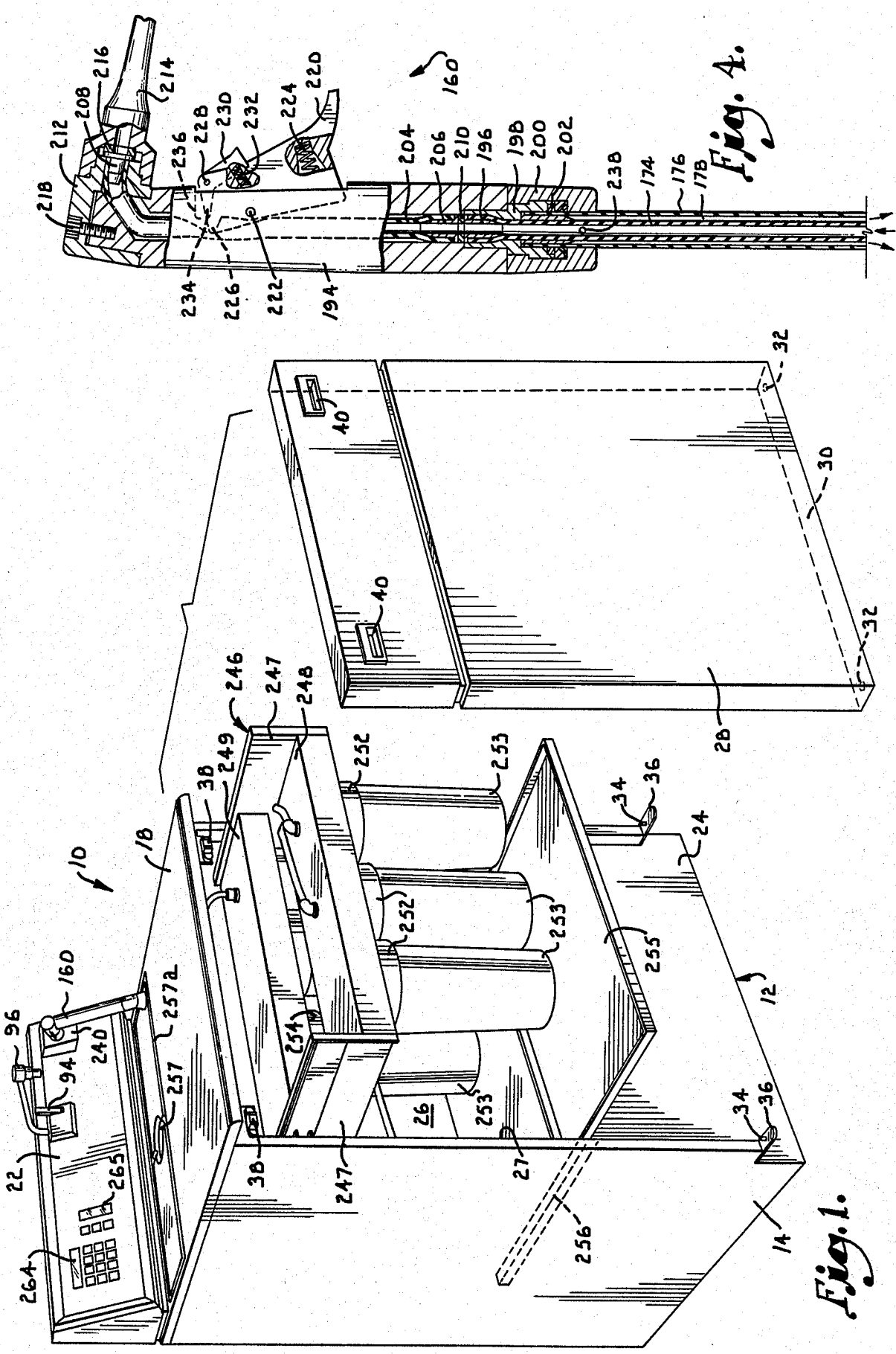

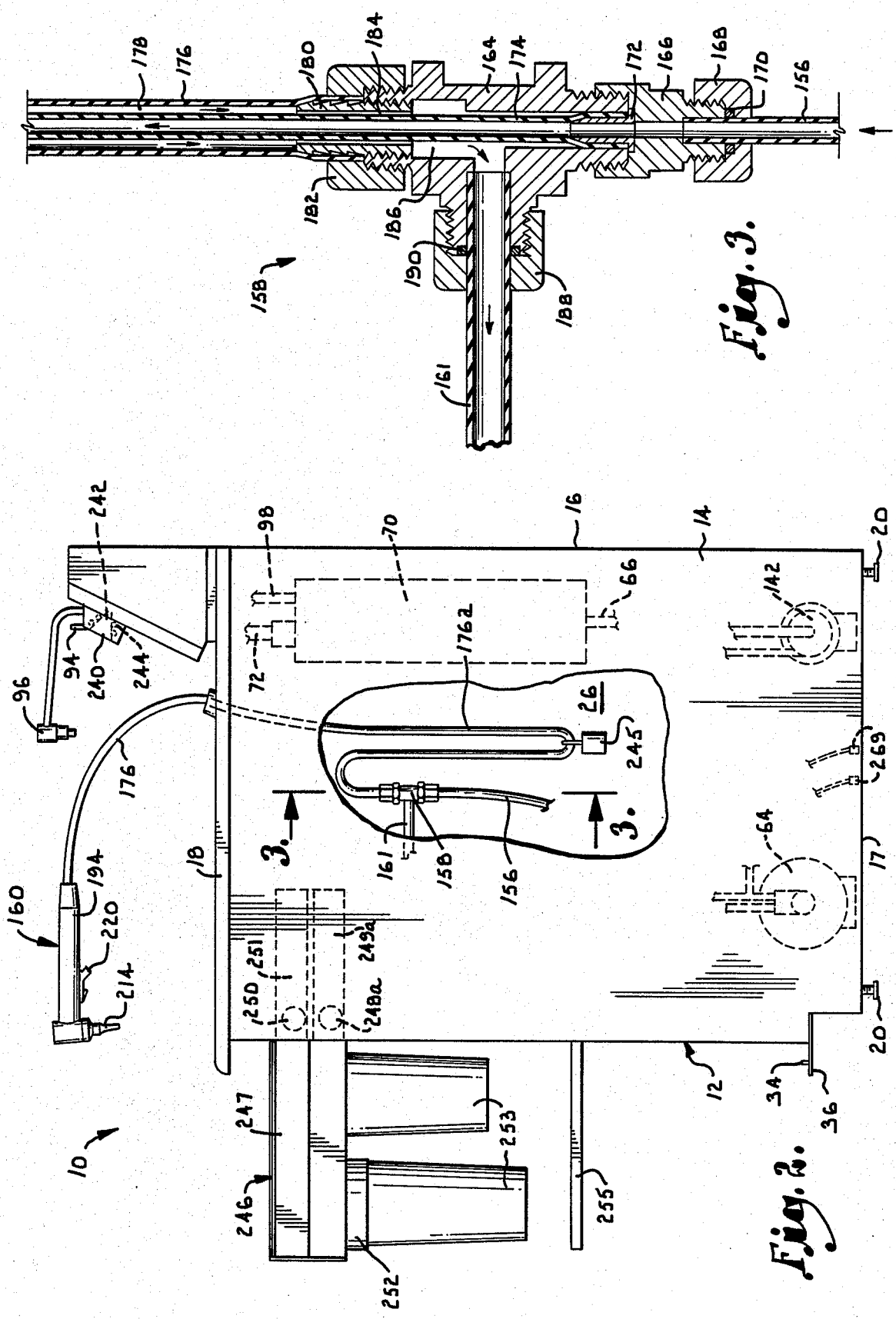

Fig. 5.

WATER PURIFICATION MACHINE

BACKGROUND OF THE INVENTION

This invention relates in general to the purification of water and more particularly to a method and apparatus for producing high purity, laboratory quality water.

In laboratory work, water having various levels of purity is required for different laboratory projects. The highest quality water is referred to as "type I" water by several professional organizations and approaches the theoretical maximum level of purity (approximately 18 megohms). Unless water having this extremely high level of purity is needed, less pure water is used.

Purified water is normally provided by reverse osmosis (RO) treatment which makes use of a thin membrane to produce product water that is 95% salt free. The reject water from the membrane contains 95% or more of the salts and is usually discarded. The product water from the RO cartridge is typically stored in a storage vessel from which it is drawn when needed. Polishing cartridges which remove dissolved contaminants and colloidal particles can be used to further process the product water and provide extremely high purity type I water which is likewise stored in a tank so that it is available when needed.

The storage of purified water and particularly type I water is undesirable because contaminants from the storage vessel tend to leach into the water and degrade its purity. In addition, stagnant water in the storage vessel is subject to bacteria contamination which causes further degradation of the purity. Stagnant water in drains and other parts of the plumbing system can cause similar problems. Another problem is that the RO membrane tends to become clogged with inorganic scale and bacteria which reduce its effectiveness and useful life. The membranes are high cost items, and the need to frequently replace them adds appreciably to the cost of producing high quality water.

SUMMARY OF THE INVENTION

The present invention is directed to a method and apparatus for processing ordinary tap water in order to produce laboratory quality water which may be dispensed at either of two different levels of purity (reverse osmosis product water or type I water). In accordance with the invention, incoming tap water is prefiltered to remove chlorine, scale and particulate contaminants, and the water is then pumped to a reverse osmosis unit which produces substantially salt free product water along with reject water which contains 95% or more of the salts. The clean water from the RO unit is delivered to a faucet on the cabinet of the machine, thus making RO product water available for dispensing from the faucet in a convenient manner.

The RO product water is also delivered to a recirculating pump which circulates it through a polishing system formed by serially arranged polishing cartridges that remove dissolved organic and inorganic contaminants and colloidal particles and microorganisms in the submicron size range. The polished type I water from the polishing cartridges is delivered to a special hand held dispensing gun from which the high purity type I water can be dispensed as desired in accurately controlled amounts.

It is a particularly important feature of the invention that the high purity type I water is continuously circulated in the polishing portion of the plumbing system. The absence of water storage in the machine avoids problems associated with the leaching of impurities and water stagnation. At the same time, high purity type I water is available at all times at the dispensing gun and can be dispensed as desired.

The dispensing gun has a unique construction which facilitates recirculation and dispensing of the type I water. A pair of concentric flexible hoses connect with the dispensing gun to supply it with incoming pure water through the inside hose while at the same time accommodating recirculation of the water away from the dispensing gun through the outer hose. A special tee fitting is provided to accommodate the circulation of high purity water in the polishing system while also accommodating the compact "tube within a tube" arrangement.

The dispensing gun is equipped with a finger operated trigger which accurately controls the dispensing of high purity water. The trigger is spring loaded and normally pinches closed a supply tube in the dispensing gun. The trigger can be activated with the finger and locked in the active position to completely open the supply tube for a maximum discharge rate, as when a large container is being filled with water. The trigger can also be operated to only slightly release the pinching action on the supply tube, and water is then dispensed drop by drop or in other closely controlled amounts so that extremely accurate metering of the water is possible, as when a volumetric flask or other vessel is being filled to a precisely specified level.

The machine of the present invention also provides a unique system for maintaining the nozzle of the dispensing gun in a sterile condition. This is accomplished by providing a heated compartment in which the nozzle is stored when the dispensing gun is not in use. The heat which is supplied to the nozzle eliminates bacteria that may be picked up, and bacteria are preventd from contaminating the water by entering through the dispenser.

An additional feature of the invention is the provision of an aspirated drain system that counters any tendency for bacterial contamination to occur in the drain. The cabinet and heater drain lines are cleared by aspiration as the RO reject water flows through the drain system, and this virtually eliminates standing water in the drain lines.

Among the other features of the invention are the reuse of part of the reject water from the RO membrane in order to conserve water and the recycling of the clean product water from the membrane in order to enhance the purity of the water which is delivered to the membrane and prevent standing water in the system. The invention also provides for regular flushing of the RO membrane to periodically flush away scale and any other contaminants it may pick up, and this increases both the effectiveness and the useful life of the membrane.

The machine is self contained and can be provided either as a free standing unit or as an undercounter unit suitable for installation beneath an existing counter. Installation is simple in that all that is required is connection to the water and drain lines of the building and electrical connection to the power that is available in the building. The cabinet is an attractive structure which includes a sink and drain, a magnetically attached door panel, and a special cartridge rack which provides convenient access to the cartridges for easy servicing of the filters.

The machine of the present invention is further characterized by a microprocessor based control system which controls all operations and constantly monitors the water quality, pressure, temperature and other conditions, all of which can be digitally displayed on the control panel. If an abnormal condition arises, the system generates an audio and visual alarm and, in the event of water leakage, the alarm is accompanied by automatic shut down of the machine.

DESCRIPTION OF THE DRAWINGS

In the accompanying drawings which form a part of the specification and are to be read in conjunction therewith and in which like reference numerals are used to indicate like parts in the various views:

FIG. 1 is a perspective view of a water purification machine constructed according to a preferred embodiment of the present invention, with the cartridge rack and drip pan of the machine in their extended positions and the door panel removed from the front of the machine;

FIG. 2 is a side elevational view of the machine shown in FIG. 1, with the special dispensing gun extended away from the control panel and a portion of the cabinet side broken away for purposes of illustration;

FIG. 3 is a fragmentary sectional view on an enlarged scale taken generally along line 3—3 of FIG. 2 in the direction of the arrows;

FIG. 4 is a fragmentary sectional view on an enlarged scale taken through the dispensing gun along a longitudinal plane;

FIG. 5 is a diagrammatic view of the plumbing system for the machine;

DETAILED DESCRIPTION OF THE INVENTION

Figure 6:
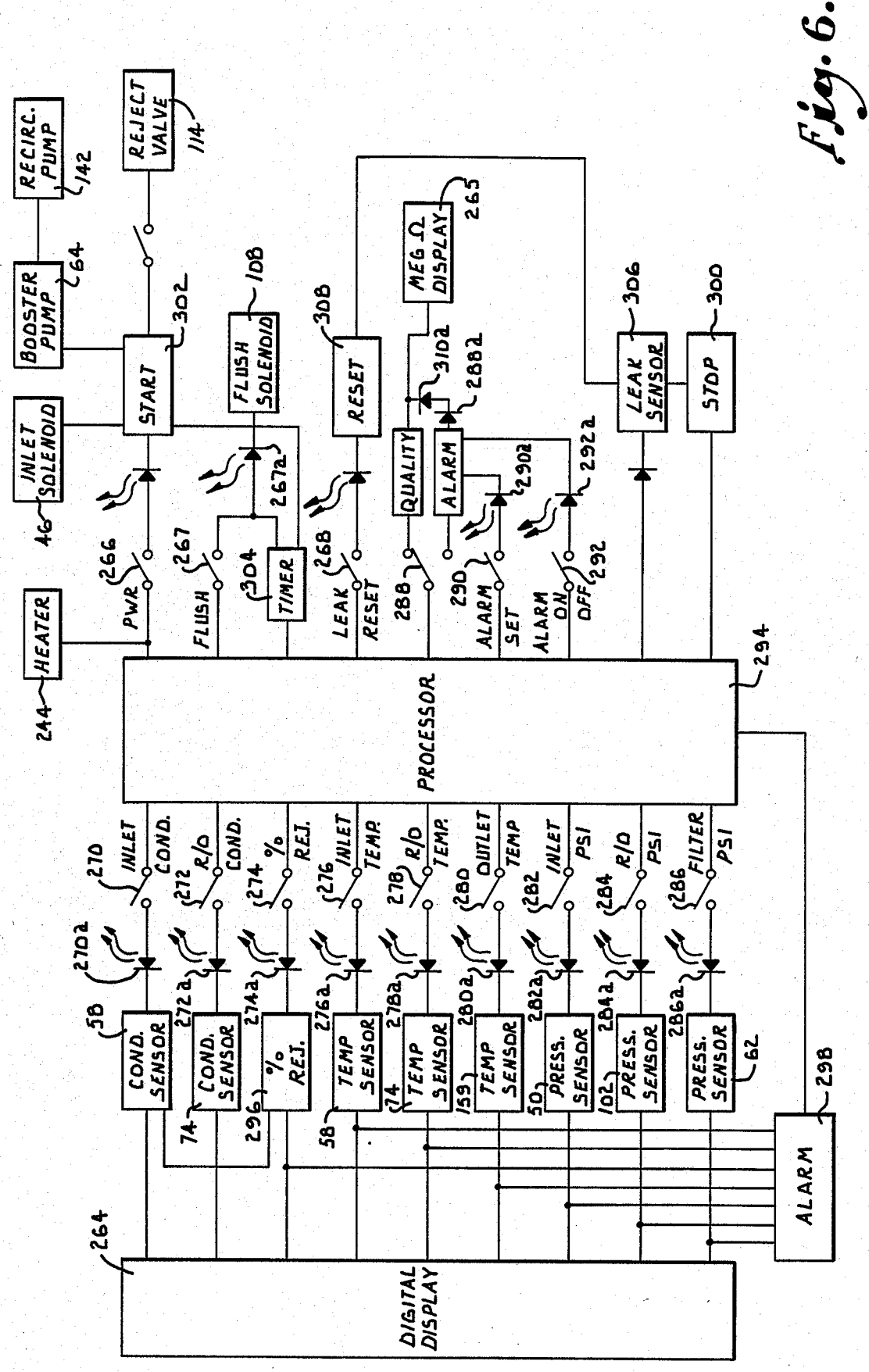
FIG. 6 is a block diagram of the electrical control system of the machine.

Referring now to the drawings in more detail and initially to FIGS. 1 and 2, numeral 10 generally designates a water purification machine constructed in accordance with the present invention. The machine 10 functions to process ordinary tap water into high purity water suitable for use in the laboratory. The machine 10 has a rectilinear cabinet which is generally designated by numeral 12 and which includes opposite side panels 14, a back panel 16, a floor 17 and a horizontal top 18. The cabinet 12 rests on adjustable feet 20. A control panel 22 projects above the top 18 near the back of the cabinet. An L-shaped shroud 24 is bolted in place to normally cover various pumps, fittings and other components of the machine that are housed within the lower portion of cabinet 12. Above the shroud 24, a compartment 26 is provided for housing a series of filter cartridges which will be described in more detail. An access opening 27 in the front of the cabinet provides ready access to compartment 26.

A removable door panel 28 normally covers the front of cabinet 12 and the access opening 27 in order to enclose the compartment 26. Panel 28 has on its lower edge a flange 30 which is provided with a pair of openings 32 near its opposite ends. When panel 28 is in place on the cabinet, the openings 32 are fitted on pins 34 which are carried on lugs 36 projecting from the front of the cabinet. Panel 28 is held in place by a pair of magnets 38 mounted on cabinet 12 at the top of the access opening 27. Panel 28 is provided with a pair of finger pulls 40 which facilitate removal of the door panel when access to compartment 26 is required. The magnetically mounted door panel 28 is preferred over a hinged door panel because it does not require significant room in front of the cabinet when open.

Figure 5:
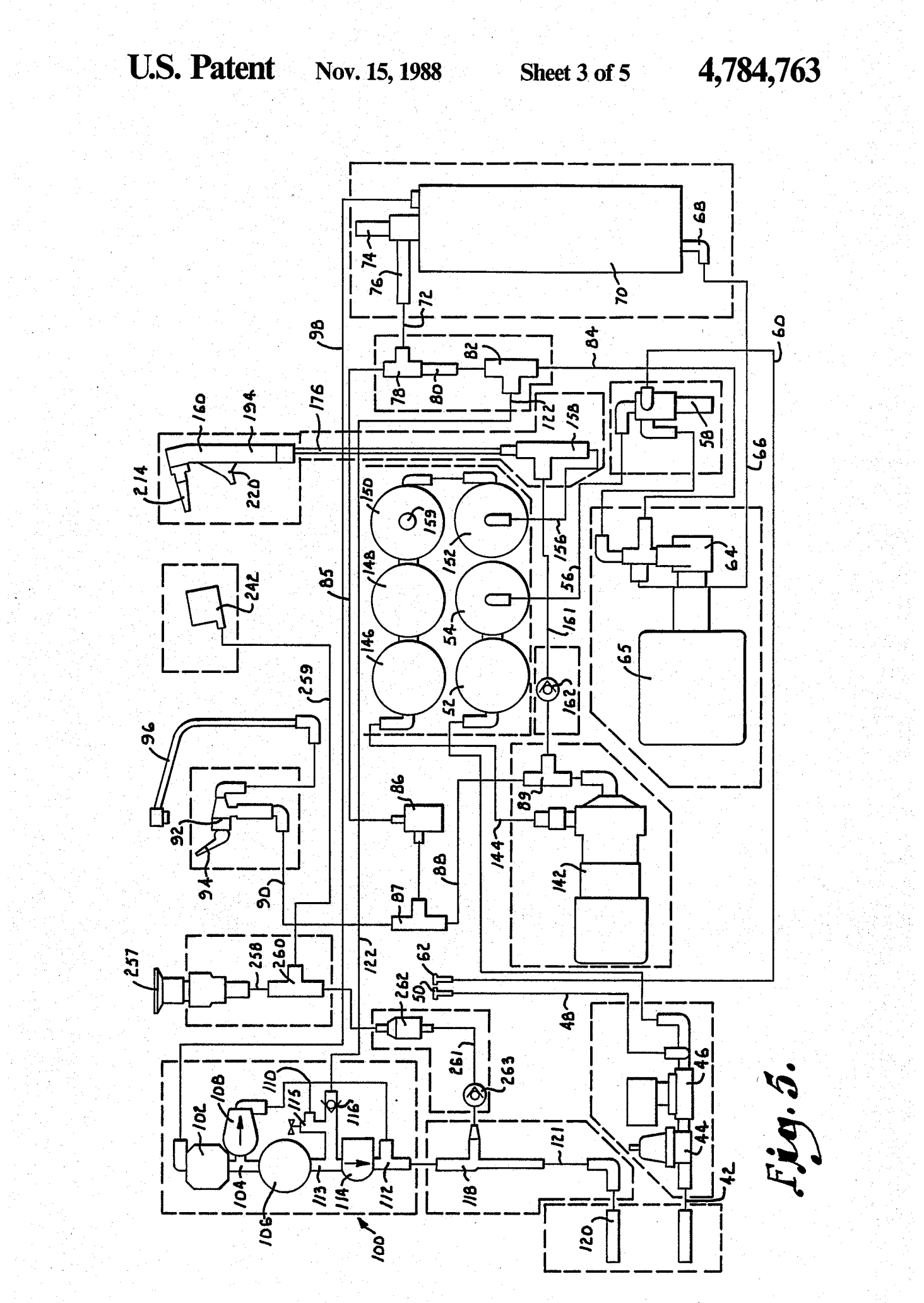

The process by which water is purified by the machine 10 is best illustrated in the plumbing diagram of FIG. 5. The plumbing system includes an inlet line 42 which connects through a service entrance with a source of feed water such as the existing water lines of the building. The inlet line 42 connects to an inlet pressure regulator 44 which protects the machine from excessive water pressure. An inlet solenoid valve 46 controls the flow of feed water into the machine. An inlet pressure sensor line 48 connects an inlet pressure transducer 50 to the inlet line.

The inlet line 42 for the incoming tap water leads to a filter cartridge 52 which preferably contains charcoal impregnated on a suitable filter medium. The filter cartridge 52 removes chlorine and particulate matter from the water. Arranged in series with filter 52 is another cartridge 54 containing sodium calcium hexametaphosphate which functions as an antiscalant. The water leaving cartridge 54 flows through line 56 to an inlet water conductivity/temperature sensor 58 which senses the electrical conductivity and temperature of the water. A post filter pressure line 60 connects with line 56 and leads to a post filter pressure transducer 62.

Downstream from sensor 58, line 56 connects to a booster pump 64 powered by an electric motor 65. The booster pump 64 has a discharge line 66 which connects to a reverse osmosis check valve 68. The reverse osmosis check valve 68 is connected to the bottom of a reverse osmosis pressure vessel 70 which contains a replaceable reverse osmosis membrane (not shown). The reverse osmosis membrane functions conventionally to remove 95% or more of the impurities which enter it. The check valve 68 allows the RO cartridge to be removed without excessive spillage of water.

The reverse osmosis purified water is discharged from vessel 70 through a product water line 72 which is equipped with a conductivity/temperature sensor 74 for monitoring of the electrical conductivity and temperature of the purified water. A check valve 76 in line 72 prevents reverse flow of water in the product water line 72.

The product water line 72 is connected to a recirculation tee 78 which distributes the product water for use. When there is no demand for purified water, the water which enters tee 78 flows through a check valve 80 to another tee 82. The water which leaves tee 82 flows through line 84 to the suction side of the booster pump 64. The check valve 80 prevents reverse flow of water into the product water line 72 from tee 78.

Tee 78 has a second outlet which connects with a product water line 85 leading to a flow switch 86 and then to a distribution tee 87. One outlet of tee 87 connects with a product water line 88 leading to a recirculation tee 89. The other outlet of tee 87 connects through a faucet supply line 90 with a faucet valve 92 controlled by an operating handle 94. Valve 92 controls the flow of clean water to a telescoping gooseneck faucet 96. As shown in FIGS. 1 and 2, faucet 96 is mounted at a convenient location on the control panel 22, and the handle 94 can be operated to open valve 92 in order to dispense reverse osmosis purified water that is delivered to faucet 96.

The reverse osmosis pressure vessel 70 has a reject line 98 which delivers the reject water to a reject manifold 100. The pressure of the reject water (operating pressure of the reverse osmosis membrane) which enters manifold 100 is monitored by a pressure transducer 102. Reject water then flows to a tee 104 which directs the water either to a back-pressure regulator 106 along one path or a solenoid flush valve 108 along another path. The backpressure regulator 106 maintains a constant backpressure on the reverse osmosis membrane. When energized, the normally closed solenoid flush valve 108 allows the water to bypass the regulator 106, resulting in a low pressure flush of the membrane. During a flush, the reject water is directed through valve 108 to a flush tee 110 and on through tee 110 to a reject drain tee 112. Connected to the downstream side of regulator 106 is a reject recirculation tee 113 which directs the reject water either to a reject control solenoid valve 114 or through an adjustment valve 115 to a check valve 116, depending upon whether or not valve 114 is open. The check valve 116 connects with tee 110.

During periods of purified water demand, the reject control solenoid valve 114 opens, directing a large volume of reject water through tee 112 and an aspirator 118 to a drain 120 for the building. A drain line 121 connects the aspirator 118 to the drain 120. When there is no purified water demand, the reject control valve 114 is closed, and the reject water is then directed largely from tee 113 through tee 110 to a recirculation line 122 which leads to the reject recirculation tee 82. The recirculating reject water then flows through line 84 to the booster pump 64. The recirculation check valve 116 prevents the flow of water in the reverse direction. During periods of no product water demand, a small fraction of the reject water is removed and sent to the drain via the reject water adjustment valve 115.

The polishing system which produces deionized Type I water includes the recirculation tee 89 which delivers the water to a recirculation pump 142. The discharge side of the recirculation pump connects with a discharge line 144 that leads to four serially arranged polishing cartridges 146, 148, 150, and 152 forming the polishing system of the machine. The first cartridge 146 contains activated carbon and removes dissolved organic compounds. The second and third cartridges 148 and 150 are ion exchange cartridges which remove ionic contaminants by ion exchange. The final cartridge 152 may be a submicron filter which removes particulate matter larger than 0.2 microns. Alternatively, cartridge 152 may be an ultrafilter cartridge, with a molecular weight cutoff of 10,000 Daltons. The polishing cartridges produce Type I water which flows through line 156 to a special tee fitting 158. A polished water resistivity/temperature sensor 159 located at the top of cartridge 150 senses the electrical resistance and temperature of the polished water.

As will be explained in more detail, the polished water delivered to fitting 158 is supplied to a specially constructed dispensing gun 160 and is circulated from the dispensing gun back to fitting 158 and then away from the fitting along a recirculation line 161. A check valve 162 prevents reverse flow of water in the recirculation line 161. The recirculation line 161 connects to the recirculation tee 89 which is in turn connected with the suction side of pump 142. The configuration of the special tee fitting 158 is best shown in FIG. 3. The fitting includes a T-shaped body 164 to which line 156 is attached through a connector 166 which is threaded onto the lower end of body 164. A nut 168 is threaded onto the lower end of connector 166 and compresses an O-ring 170 which seals line 156 to the connector. The connector 166 retains a flanged tube support 172 in the end of a flexible supply hose 174 which extends through body 164 and also through a flexible outer hose 176. Hose 176 is larger in diameter than the supply hose 174 and is sleeved around the supply hose in order to form an annular flow passage 178 between hoses 174 and 176. Passage 178 accommodates water which is returned from the dispensing gun, as will be explained in more detail.

The outer hose 176 is secured to the top of body 164 by a barbed fitting 180 on the inside and a nut 182 threaded onto body 164 outside of hose 176. Fitting 180 is somewhat larger than hose 174 in order to provide a flow passage 184 which connects passage 178 with a flow chamber 186 formed within body 164. The flow chamber 186 is isolated from the inside of the supply hose 174 and connects with the recirculation line 161 in order to deliver the recirculating water thereto. A nut 188 is threaded onto body 164 to compress an O-ring 190 which provides a seal between body 164 and the recirculation line 161.

The details of the special dispensing gun 160 are best shown in FIG. 4. The gun 160 is a hand held dispenser and includes a generally cylindrical body 194 having a size and shape to be conveniently held in the hand. The supply hose 174 extends into the lower end of the body 194 and receives in its end a flanged tube support 196 held by a fitting 198 which is in turn secured by an end cap 200. An O-ring 202 seals fitting 198 to the outer hose 176. Within body 194, the supply hose 174 connects with a compressible supply tube 204 which is held in place at the bottom by a flanged tube support 206 and at the top by another flanged tube support 208. Tube support 206 is sealed to tube support 196 by a sealing ring 210. Tube 204 extends into the head 212 of the dispensing gun and has in its end the flanged tube support 210 which is sealed to a nozzle 214 by a sealing ring 216. The head 212 is secured to the body 194 by a screw 218. Nozzle 214 terminates in a dispensing tip through which the polished water is dispensed. The nozzle may be threaded onto the head 212 or secured in any other suitable manner.

The supply tube 204 is controlled by a finger operated trigger 220 which is mounted on the dispenser body 194. A pivot pin 222 mounts the trigger 220 on the dispenser body 194, and a compression spring 224 continuously urges trigger 220 to pivot about pin 222 toward the closed position of the dispenser shown in FIG. 4. In this position, a tip 226 of the trigger 220 pinches the supply tube 204 closed, thus completely blocking the flow of water to the nozzle 214.

When the free end of trigger 220 is depressed, the trigger is pivoted against the force of the compression spring 224. The pinching of the supply tube 204 is then relieved and tube 204 is open to permit the flow of water to the dispensing tip of the nozzle. When trigger 220 is fully depressed, tube 204 is fully opened, and water is then dispensed at the maximum rate. Trigger 220 can be opened to any desired extent in order to dispense water at various rates between the fully opened and fully closed condition. A pivot pin 228 mounts a trigger latch 230 in the trigger 220. A compression spring 232 continuously urges the latch to remain in the retracted position, as shown in FIG. 4. When the trigger 220 is in the fully open position, pivoting the latch 230 against the force of the compression spring 232 elevates the latch tip 234. A slight decrease in the trigger 220 actuation will then capture the tip 234 of latch 230 in receiving notch 236 formed in the dispenser gun body 194. The contact of the latch tip 234 in the receiving notch 236 prevents further travel of the trigger 220 against the force of compression spring 224, thus locking the dispensing pistol into a fully open position. A slight actuation of the trigger 220 allows the latch compression spring 232 to pivot the latch 230 back into the retracted position, allowing the trigger 220 to actuate freely.

The construction and arrangement of the supply tube 204 and trigger 220 and the pinching action provided by the trigger permits accurate metering of the rate at which water is dispensed from the dispensing gun 160. By depressing the trigger only slightly, the supply tube 204 can be only slightly opened such that water is able to pass through the supply tube one drop at a time, and the water is then dispensed through nozzle 214 drop by drop, as when a volumetric flask is being filled to a specified level. The latching action of the trigger provided by latch 220 allows large volumes of water to be dispensed, as when large storage tanks are being filled, without requiring that continuous pressure be maintained on the trigger.

The supply hose 174 is provided with a plurality of openings 238 at a location adjacent the dispensing gun 160. Openings 238 provide passages through which the polished water can flow from tube 174 into the annular flow passage 178 which leads to the special tee fitting 158 and to the recirculation line 161.

When the dispensing gun 160 is not in use, it is stored on the control panel 22 in the position shown in FIG. 1. A boss 240 formed on the control panel 22 is provided with a pocket or compartment 242 (see FIG. 2) having a size and shape to closely receive the nozzle 214 of the dispensing gun. The fit of the nozzle in compartment 242 maintains the dispensing gun in its storage position on the machine. An electric heating element 244 is coiled around compartment 242 and heats the compartment to a temperature of approximately 90° C. The heat is supplied to nozzle 214 and is sufficient to eliminate any bacteria that may be picked up on the tip of the dispensing gun. In this manner, the dispensing gun nozzle is maintained in a sterile condition, and bacteria are prevented from contaminating the polished water through the dispensing gun.

With reference to FIG. 2 in particular, hose 176 (and the smaller hose 174 contained therein) extends within compartment 26 of the cabinet and connects with the dispensing gun 160 through a passage formed in the top panel 18 of the cabinet. Within compartment 26, hose 176 is looped at 176a, and a weight 245 is hung on the loop 176a. The weight 245 urges the dispensing gun 160 to retract toward the cabinet. When the dispensing gun is to be used to dispense water, it can be removed from the storage compartment 242 and extended to the location desired. Hose 176 then extends through the opening in panel 18 against the force applied by the weight 245. When the gun is stored on the control panel 22, weight 245 acts to retract hose 176 within compartment 26.

The filter and polishing cartridges are held on a special rack 246 which is best shown in FIGS. 1 and 2. The rack 246 includes opposite sides 247 and a pair of horizontal plates 248 and 249 which extend between the sides 247. Each side 247 is provided with a wheel 248a (see FIG. 2) which rides in a track 249a mounted on the inside surface of the cabinet side panel 14. Similarly, the side panels 14 are provided with wheels 250 which roll in tracks 251 on the opposite sides 247 of the rack. The wheels and tracks allow rack 246 to be fully retracted into compartment 26 when the machine is in operation, and they also permit the rack 246 to be extended out of the compartment for easy access to and servicing of the filter and polishing cartridges.

The cartridges are carried on rack 246 in two rows. The front row includes three of the cartridges (such as cartridges 52, 54 and 152) carried on the front plate 248. The back row includes the other three cartridges (146, 148 and 150) which are carried on the back plate 249. Each cartridge includes a cap 252 into which a cartridge body 253 is threaded. The filter material or other functional part of each cartridge is contained within the cartridge body 253, while each cap 252 is secured to the underside of one of the plates 248 or 249.

The construction of rack 246 facilitates changing of the filters and other servicing of the cartridges. The three cartridges in the front row are easily accessible, and each cartridge body 253 can be turned in order to unthread it from and thread it into its cap 252. The cartridges in the back row are not as accessible, but they can be reached without great difficulty when the rack 246 is extended to the position shown in FIG. 1. The back plate 249 is raised relative to the front plate 248, and a space 254 is thereby provided through which the threaded connections between caps 252 and the cartridge bodies 253 in the back row can be viewed. Consequently, the serviceman changing the filters is able to view the caps in the back row and can easily thread the cartridge bodies into them since he does not have to rely entirely on "feel" in order to start the threading of the cartridge bodies.

A sliding drip pan 255 is located at the bottom of compartment 26. Pan 255 is supported on a pair of slides 256 (see FIG. 1) which are part of shroud 24. Consequently, pan 255 can be extended beneath rack 246 when the rack is extended, and the drip pan then underlies the cartridges carried on the rack in order to catch any water that may spill when the cartridges are being changed or otherwise serviced. Pan 255 can be removed to pour out any water that it catches, and it can be slid back into compartment 26 when rack 246 is retracted into the cabinet.

The upper surface of the cabinet top 18 is provided with a drain opening 257 and with grooves 257a which direct spilled water to the drain opening. Opening 257 and grooves 257a are located adjacent to the control panel 22 where they are best able to catch any water that spills from the faucet 96 or the dispensing gun 160. As shown diagrammatically in FIG. 5, the drain opening 257 and compartment 242 connect with respective drain lines 258 and 259 which lead to a tee 260. Extending from the tee 260 is a drain line 261 equipped with a filter 262 and a check valve 263. Line 261 leads to the aspirator 118. Thus, waste water from the drain opening 257 and compartment 242 is removed by the vacuum created by the aspirator 118 from tee 112 through the aspirator and drain line 121.

Figure 7:
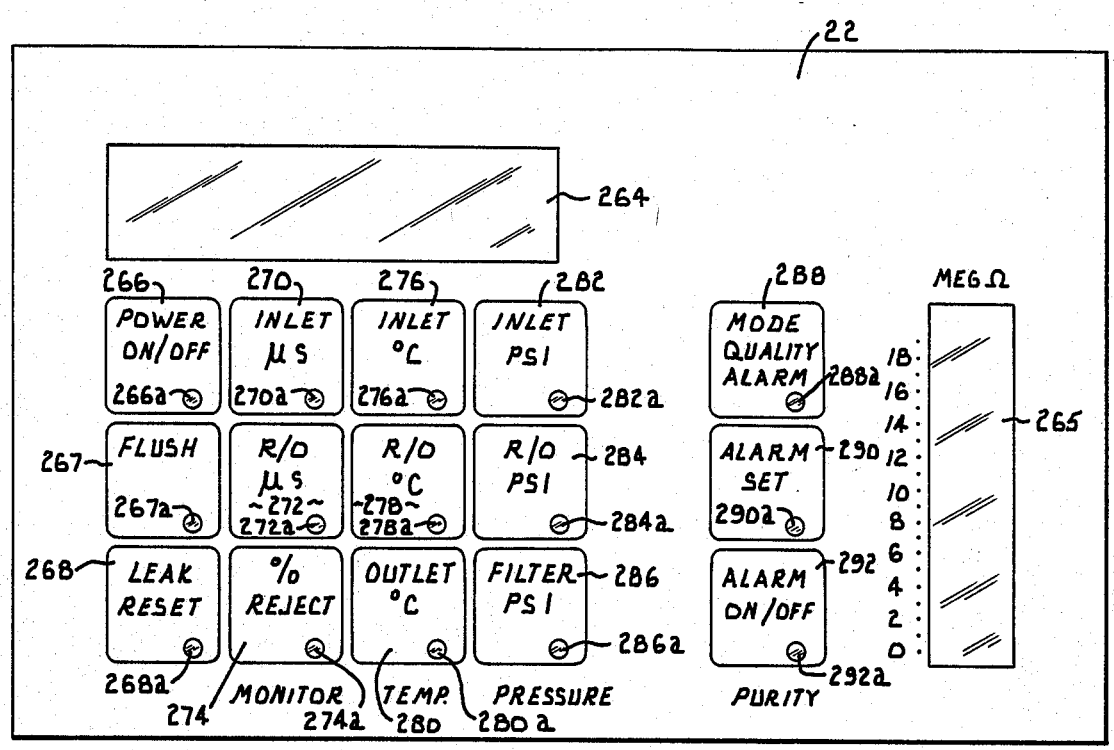
FIG. 7 is an elevational view on an enlarged scale showing the key pad and display screens on the control panel of the machine.

The control panel 22 of the machine is provided with a key pad and a display which are best shown in FIG. 7. A main screen 264 provides a digital display of the various conditions that are monitored by the control system. The water quality of the type I water may be displayed on a megohm-cm display screen 265 which is preferably a bar type display. The key pad includes a power key 266 having an associated LED 266a which is energized when the power key is depressed to provide operating power to the machine. A flush key 267 may be depressed to open the normally closed flush solenoid valve 108, and LED 267a is activated whenever the flush solenoid is energized either by depression of key 267 or by automatic flushing of the RO membrane, as will be described more fully.

A leak reset key 268 may be depressed to reset the leak system after it has detected a leak and deactivated the machine. The leak system includes a pair of spaced apart electrical contacts 269 located on the floor 17 of the cabinet (See FIG. 2). If water leaks onto the floor, there is electrical continuity between the contacts 269, and this deactivates the machine. The machine can be reset only when the leak condition has been corrected. The leak reset key 268 has an associated LED 268a.

The key pad further includes an inlet conductivity key 270 which may be activated to provide a digital display on screen 264 of the conductivity of the inlet water (displayed in micro siemens). Key 270 has an associated LED 270a. An R/O conductivity key 272 may be activated to provide a digital display of the conductivity of the water produced by the membrane of the RO cartridge 70. An LED 272a is energized when the R/O conductivity is being displayed. A percent reject key 274 may be activated to provide a display of the percent of the salts that the RO membrane is rejecting (based on electrical conductivity). An associated LED 274a is energized when the percent reject key is active.

Temperature display keys 276, 278 and 280 are provided on the key pad. Each has an associated LED 276a, 278a or 280a which is energized when the corresponding key is active. When key 276 is active, a digital display is provided indicating the temperature of the incoming water as sensed by the inlet temperature sensor 58. Key 278 provides a digital display of the temperature of the clean water produced by the RO membrane, as sensed by sensor 74. Activation of key 280 provides a digital display of the temperature of the polished water, as sensed by sensor 159.

The key pad also includes pressure keys 282, 284 and 286 and associated LEDs 282a, 284a and 286a. When key 282 is active, screen 264 provides a digital display of the pressure of the incoming water, as sensed by the pressure transducer 50. Activation of key 284 provides a digital display of the pressure sensed by pressure transducer 102. Key 286 provides a digital display of the pressure drop from the inlet pressure transducer 50 and the post-filter pressure transducer 62.

Key 288 permits selection to be made between a display on screen 265 of the polished water quality (in megohms-cm), as detected by sensor 159, and the water quality alarm set point, which may be set by key 290. When the display is in the alarm set point display mode, LEDs 288a and 290a are energized. Key 290 can be used to select any water quality alarm point between 1 and 18 megohms-cm. Key 292 is used to activate and deactivate the audible alarm. An LED 292a is energized when the alarm is active and is deenergized when the alarm is inactive.

The machine includes a microprocessor based electrical control system which is illustrated in block diagram form in FIG. 6. A microprocessor 294 controls the operation of the machine and generates the displays on screens 264 and 265 under the control of the keys on the key pad. For example, when the inlet conductivity key 270 is activated, the microprocessor 294 causes the screen 264 to provide a digital display of the conductivity of the inlet water as sensed by the inlet conductivity sensor 50. When key 274 is active, a percent reject block 296 calculates the percent of salts that are rejected by the membrane of the RO unit 70. This calculation is made by subtracting the conductivity of the reverse osmosis product water from the conductivity of the inlet water and dividing the difference by the conductivity of the inlet water (and then converting to percentage). Normally, 95% or more of the salts are rejected by the RO unit 70. However, if the rejection percentage falls below a preselected level (such as 80%, for example), an audible alarm 298 is automatically activated to generate an audible alarm signal, and LED 274a is caused to flash. Thus, both audible and visible alarms are generated if the percent of salt rejection in the reverse osmosis membrane is abnormally low, thus indicating that corrective action should be taken.

Similarly, keys 276, 278, 280, 282, 284, and 286 can be activated to provide on screen 264 a digital display of the temperatures and pressures in various parts of the plumbing system. If the inlet temperature sensed by sensor 58 is excessive (such as above 35° C., for example), LED 276a is caused to flash and the alarm 298 is activated. In addition, the machine is automatically shut down by block 300. If the temperature sensed by sensor 24 exceeds a predetermined level (such as 40° C.), LED 278a flashes, the alarm 298 is activated, and block 300 shuts down the machine. In this manner, excessive water temperatures are avoided and both audible and visual alarm signals are given to indicate the existence of abnormal temperature conditions. The temperature keys 276 and 278 can be depressed to reset the machine into normal operation once the abnormal temperature condition has been corrected.

If the pressure sensed by sensor 50 is unduly low (such as if it drops below 10 psi three times within a four minute time period), LED 282a flashes, the alarm 298 is activated and block 300 shuts down the machine. Once the problem has been corrected, the machine is reset by depression of key 282. If the pressure sensed by sensor 102 is abnormally low (such as less than 170 psi), LED 284a flashes and the alarm 298 is activated. Again, the problem can be corrected and the machine can be reset by depression of key 284. If the pressure difference between sensors 50 and 62 is excessive (such as 15 psi, for example), indicating that the prefilter is clogged, LED 286a flashes and the alarm 298 is activated. After the alarm condition has been remedied, key 286 can be depressed to reset the machine.

Activation of the power key 266 turns the machine on through a start block 302, and the inlet solenoid valve 46 and the pumps 64 and 142 are then energized. A timing circuit 304 is arranged in parallel with the manual flush key 267 such that the flush solenoid valve 108 is opened whenever key 267 is depressed and also whenever the timer 304 causes automatic opening of valve 108. Preferably, the timer 304 is set to cause the occurrence of a four minute flush cycle every two hours. If the machine is inactive (power off) when the automatic flush occurs, the inlet solenoid valve 44 and both pumps 64 and 142 are activated along with valve 108 for the duration of the flush cycle.

When a leak is detected by contacts 269, the machine is immediately shut down via blocks 306 and 300. If the condition causing the leak has been corrected, the leak reset key 268 can be activated to reset the leak system 306 through reset block 308.

The selector switch 288 can be set in the position shown in FIG. 6 to cause the megohm display 265 to visually indicate the quality of the type I polished water in megohms-cm. Switch 288 can be depressed again to cause the megohm-cm display 265 to display an alarm setting which is the (arbitrarily selected) minimum water quality that is acceptable. Switch 290 can be activated to set the water quality alarm set point at any selected value between 1 and 18 megohms-cm. Switch 292 can be depressed to activate or deactivate the audible alarm. If the alarm is activated and the water quality drops below the set level, LED 290a is caused to flash and an audible alarm signal is generated to indicate both visually and audibly that the water quality is unduly low.

In operation of the machine, ordinary tap water from the water line of the building is supplied to the inlet line 42 and is directed through the prefilters 52 and 54 which remove chlorine, particulate matter and add an antiscalant. The filtered water is then delivered to the booster pump 64 which increases the pressure of the water flowing through line 66 to the RO cartridge 70. The RO membrane removes 95% or more of the impurities contained in the tap water and discharges the purified product water through line 72. The reject water is discharged through line 98. The product water flows through fitting 78 and along line 85 to the flow switch 86. The product water is then delivered to tee 87 where it is made available to the gooseneck faucet 96 on the control panel 22 of the machine. By operating the handle 94, the product water can be dispensed as desired from the faucet 96.

The reject water which the RO unit 70 discharges through line 98 is delivered to the reject manifold 100 and normally flows through the pressure sensor 102, fitting 104, the pressure reulator 106, fitting 113, valve 114, tee 112, aspirator 118 and to the service drain of the building via line 121. When there is no demand for purified water, the machine reverts to a standby mode of operation in which most of the reject water is recycled. The flow pattern in the standby mode is through pressure sensor 102, fitting 104, pressure regulator 106, fitting 113, check valve 116, recirculation line 122 and through the recirculation tee 82 to the booster pump 64 via line 84. A small part of the reject water is diverted from the recirculation path by valve 115 and delivered through tees 110 and 112 to the aspirator 118 and then to the service drain via line 121.

In this manner, during periods when there is no demand for purified water, water is conserved since part of the reject water is recycled through the RO cartridge 70. In addition, during standby operation, all of the product water is recirculated through tee 82 to the reverse osmosis unit 70, thus enhancing the purity of the water which is supplied to the intake of pump 64. This in turn allows the reverse osmosis membrane to function more efficiently in removing impurities from the water because the impurity content of the feed water is diluted by the product water.

Whenever the flush valve 108 is open, the reject water which reaches the reject manifold 100 is able to flow to the drain through fitting 102, valve 108, tee 110, tee 112, aspirator 118 and line 121. This flush path bypasses the backpressure regulator 106, and the water is able to flow through the reverse ososis membrane at a reduced pressure and, thus, an increased velocity. The increased velocity of water across the surface of the membrane cleans the membrane by removing scale, bacteria and other deposits from it. As previously indicated, the flush valve 108 is opened automatically at regular intervals in order to periodically flush the RO membrane. In addition, key 267 can be manually depressed at any time the machine is activated in order to effect a flush cycle lasting a preselected time (such as four minutes, for example). At the end of each flush cycle, valve 108 closes and the normal path to the drain is reestablished.

Water which spills into the cabinet drain opening 256 or compartment 242 drains into line 261. As reject water flows through line 121 to the service drain of the building, the water in line 261 is drawn by aspiration (provided by the aspirator 118) into line 121. Thus, gravity is not relied upon to drain water from lines 258 and 259, and the constant aspirating force applied to line 261 and tee 260 prevents water from standing in the drain lines, thus eliminating a possible source of bacterial contamination. In addition, the positive aspirating force that is applied by aspirator 118 allows the machine drain line to be placed at a higher level than the drain opening 257 or compartment 242.

The reverse osmosis product water which is supplied to faucet 96 is also made available to the polishing system. The product water passes from tee 87 through line 88 and tee 89 to the intake 140 of pump 142. The water is discharged from pump 142 through line 144 and is pumped serially through polishing cartridges 146, 148, 150 and 152. The polished water produced by the polishing system flows along line 156 to the special tee fitting 158 and is made available to the dispensing gun 160 through the inner hose 174. The water that is not dispensed from the dispensing gun 160, flows through openings 238, into passage 178 and back through fitting 158 to the recirculation line 161. The recirculating water is directed through check valve 162 and tee 89 back to the intake of pump 142 which again pumps it through the polishing system.

By virtue of this arrangement, polished high purity type I water is immediately available at all times to the dispensing gun 160. At the same time, the type I water is continuously recirculated through the polishing system and does not remain stationary such that it could be subject to stagnation and other problems associated with the storage of high purity water in a tank. Similarly, the reverse osmosis product water is recycled to pump 64 and is thus kept constantly in motion to avoid stagnation and related problems.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, What is claimed is:

1. A water purification apparatus comprising:
an inlet line for receiving feed water to be purified;
reverse osmosis means for receiving the feed water and producing therefrom clean water and reject water of lesser purity than the clean water;
main pump means for pumping water from the inlet line to said reverse osmosis means;
a clean water line coupled with said reverse osmosis means for receiving the clean water therefrom, said clean water line being split into first and second alternative paths;
a drain line for receiving the reject water from said reverse osmosis means;
a clean water dispenser coupled with said first path of the clean water line and selectively operable to dispense the clean water therein;
water polishing means coupled with said second path of the clean water line for receiving the clean water therein and polishing same to produce higher quality polished water;
means for pumping the clean water from said second path of the clean water line through said polishing menas; and
a polished water dispenser for receiving and selectively dispensing the polished water.

2. Apparatus as set forth in claim 1, including pretreatment means in said inlet line for pretreating the feed water before same reaches said reverse osmosis means, said pretreatment means including menas for removing particulate contamination and chlorine from the feed water and means for adding an antiscalent chemical to the feed water.

3. Apparatus as set forth in claim 2, including:
means for detecting the pressure drop across said pretreatment means; and
means for providing an alarm signal when said pressure drop exceeds a preselected value.

4. Apparatus as set forth in claim 1, including means for recirculating part of the reject water in said drain line to said main pump means for passage through said reverse osmosis means along with additional incoming feed water.

5. Apparatus as set forth in claim 4, including means for recirculating the clean water in said clean water line to said main pump means for passage through said reverse osmosis means along with said part of the reject water and additional incoming feed water.

6. Apparatus as set forth in claim 1, including means for recirculating the clean water in said clean water line to said main pump means for passage through said reverse osmosis means along with additional incoming feed water.

7. Apparatus as set forth in claim 1, including:
a cabinet for supporting said clean water dispenser and said polished water dispenser;
a drain on said cabinet for receiving water disposed thereon; and
a drain conduit coupling said drain with said drain line for disposing of water in the drain.

8. Apparatus as set forth in claim 7, wherein said drain conduit is coupled with said drain line in a manner to draw liquid in the drain conduit into the drain line by aspiration when reject water is flowing in the drain line.

9. Apparatus as set forth in claim 7, including:
a dispensing nozzle on said polished water dispenser through which the polished water is dispensed;
a compartment on said cabinet for receiving said dispensing nozzle when the polished water dispenser is stored;
means for heating said compartment to eliminate bacteria on said nozzle; and
means for draining said compartment into said drain line.

10. Apparatus as set forth in claim 1, including flush means for effecting flow through said reverse osmosis means at an increased rate to flush scaling and bacteria therefrom.

11. Apparatus as set forth in claim 10, including means for activating said flush means at preselected intervals and maintaining said flush means active for a predetermined time each time said flush means is activated.

12. Apparatus as set forth in claim 11, including a manual switch for said flush means operable to activate same for a predetermined time.

13. Apparatus as set forth in claim 1, including:
a reject line extending from said reverse osmosis means to receive the reject water therefrom;
a reject valve for connecting said reject line with said drain line when the valve is open and disconnecting said reject line from said drain line when the valve is closed;
a pressure regulator connected between said reject and drain lines to regulate the pressure on said reverse osmosis means;
a flush line connecting said reject line with said drain line when the flush line is open, said flush line bypassing said pressure regulator;
a flush valve in said flush line for opening and closing same; and
means for opening said flush valve, thereby effecting flow of reject water through the drain line and bypassing said pressure regulator to increase the flow rate through said reverse osmosis means for flushing of same.

14. Apparatus as set forth in claim 13, including a bypass line connecting said reject line with said drain line through said pressure regulator in a path bypassing said reject valve and said flush valve.

15. Apparatus as set forth in claim 1, including a recirculation line extending from said polished water dispenser to said pumping means for the clean water to recirculate the polished water through said polishing means.

16. Apparatus as set forth in claim 1, including means for monitoring the purity of the polished water at said polished water dispenser and means for providing an alarm signal when the purity of the polished water is below a preselected level.

17. Apparatus as set forth in claim 1, including means for detecting the leakage of water and means for deactivating said pump means when water leakage is detected.

18. Apparatus as set forth in claim 1, including means for monitoring the conductivity of the clean water from said reverse osmosis means and means for displaying said conductivity.

19. In a water pruification system having a reverse osmosis treatment unit for providing clean water, the improvement comprising:
a clean water line for receiving the clean water, said clean water line being split into first and second alternative paths;

a clean water dispenser coupled with said first path of the clean water line and selectively operable to dispense the clean water therefrom for use;

a recirculating pump having an intake side communicating with said second path of the clean water line to receive the clean water therefrom and a discharge side opposite the intake side;

water polishing means coupled with said discharge side of the pump for receiving the clean water and polishing same to provide polished water having a higher purity than the clean water;

a polished water dispenser selectively operable to dispense the polished water;

a tube communicating at one end with said polishing means to receive the polished water therefrom and coupled at the other end with said dispenser to deliver the polished water thereto; and a recirculation line coupled at one end with said tube and at the other end with the intake side of the pump to recirculate the polished water through said polishing means.

20. The improvement of claim 19, including:

a fitting having a first flow passage therein providing communication between said polishing means and said tube;

a second tube larger than the first-mentioned tube and sleeved around same to present a generally annular flow passage between the first and second tubes, said second tube extending between said fitting and said polished water dispenser and said annular passage forming part of said recirculation line;

an opening in the first tube for directing the water from the first tube into said annular passage, said opening being adjacent the polished water dispenser;

a recirculation conduit extending from said fitting and communicating with the intake side of the pump to form another part of said recirculation line; and a second flow passage in said fitting providing communication between said second tube and said recirculation conduit, said second flow passage being isolated from said first flow passage.

21. The improvement of claim 20, including:

a cabinet presenting a compartment therein and a cabinet opening through which said first and second tubes extend, said first and second tubes being flexible to extend and retract through said cabinet opening to permit the polished water dispenser to be moved away from and toward the cabinet; and a weight on said second tube at a location within said compartment for biasing the polished water dispenser toward a retracted position adjacent the cabinet.

22. The improvement of claim 19, wherein said polished water dispenser includes:

a dispensing nozzle for dispensing the polished water;

a compressible conduit providing communication between said tube and said dispensing nozzle, said conduit being compressible to accurately regulate the rate at which polished water is dispensed from said nozzle;

a finger operated trigger movable between a closed positon wherein the trigger effects pinching of said conduit to prevent dispensing of polished water and an open position wherein flow through the conduit is unrestricted for dispensing of the polished water at a maximum rate; and means for urging said trigger toward the closed position.

* * * * *